United States Patent

(12) United States Patent
Yang

(10) Patent No.: US 6,994,476 B1
(45) Date of Patent: Feb. 7, 2006

(54) DUAL-USE COAXIAL OPTICAL FIBER CONNECTOR

(76) Inventor: Johnson Yang, 1F, No. 93, Ciaohe Rd., Jhonghe City, Taipei County 235 (TW)

(*) Notice: Subject to any disclaimer, the term of this patent is extended or adjusted under 35 U.S.C. 154(b) by 0 days.

(21) Appl. No.: 10/914,429

(22) Filed: Aug. 9, 2004

(51) Int. Cl.
*G02B 6/36* (2006.01)

(52) U.S. Cl. .................................................. 385/53

(58) Field of Classification Search ............ 385/53–75, 385/88–89, 92–94; 439/135–139, 271–273
See application file for complete search history.

(56) References Cited

U.S. PATENT DOCUMENTS

| | | | | |
|---|---|---|---|---|
| 5,909,526 A | * | 6/1999 | Roth et al. ..................... | 385/78 |
| 6,206,577 B1 | * | 3/2001 | Hall et al. ..................... | 385/53 |
| 6,240,229 B1 | * | 5/2001 | Roth ............................. | 385/53 |
| 6,471,412 B1 | * | 10/2002 | Belenkiy et al. ............... | 385/53 |
| 6,481,902 B2 | * | 11/2002 | Takaoka et al. ............... | 385/92 |
| 6,715,928 B1 | * | 4/2004 | Matasek et al. ............... | 385/56 |
| 2003/0219216 A1 | * | 11/2003 | Yang et al. ..................... | 385/88 |

* cited by examiner

*Primary Examiner*—Rodney Bovernick
*Assistant Examiner*—Mike Stahl
(74) *Attorney, Agent, or Firm*—Charles E. Baxley

(57) ABSTRACT

A dual-use coaxial optical fiber connector comprises a main body, a spring, an assembly seat and a dust-proof cover. An assembly seat is provided with assembling bevels and locking holes which are used to engage with the assembling grooves and the locking elements of the main body, so as to enable the assembly seat to be more firmly assembled on the main body. Furthermore, the main body is provided with a spring seat which is specially designed for accommodation of a spring so as to prevent the loss of the spring during assembly. The spring is accommodated in the spring seat of the main body so as to push the dust-proof cover to seal the assembling hole of the assembly seat, thus the optical fiber connector can be prevent from dust.

3 Claims, 4 Drawing Sheets

DUAL-USE COAXIAL OPTICAL FIBER CONNECTOR

BACKGROUND OF THE INVENTION

1. Field of the Invention

The present invention relates to a connector, and more particularly to a dual-use coaxial optical fiber connector that is used for signal transmission.

2. Description of the Prior Arts

A conventional optical signal transmission system generally includes a light-emitting-and-receiving device (such as laser diode) serving to provide optical signal that is transmitted to another light-emitting-and-receiving device via an optical fiber. Since the light-emitting-and-receiving devices and the optical fiber are structurally independent from each other, they need to be connected by using a connector.

TW Patent 92,215,166 discloses an optical emitting-and-receiving device, as shown in the drawings, which is not provided with dust-proof structure at the terminal-inserting holes. In this case, dust will enter into the optical emitting-and-receiving device when pulling and inserting the terminal, and this will lead to a bad influence on the light-transmission quality.

The present invention has arisen to mitigate and/or obviate the afore-described disadvantages of the conventional multi-fan assembly.

SUMMARY OF THE INVENTION

The primary object of the present invention is to provide a dual-use coaxial optical fiber connector, wherein an assembly seat is provided with assembling bevels and locking holes which are used to engage with the assembling grooves and the locking elements of the main body, so as to enable the assembly seat to be more firmly assembled on the main body. Furthermore, the main body is provided with a spring seat which is specially designed for accommodation of a spring, so as to prevent loss of the spring during assembly.

The secondary object of the present invention is to provide a dual-use coaxial optical fiber connector, wherein the spring is accommodated in the spring seat of the main body so as to push the dust-proof cover to seal the assembling hole of the assembly seat, thus the optical fiber connector can be prevent from dust.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
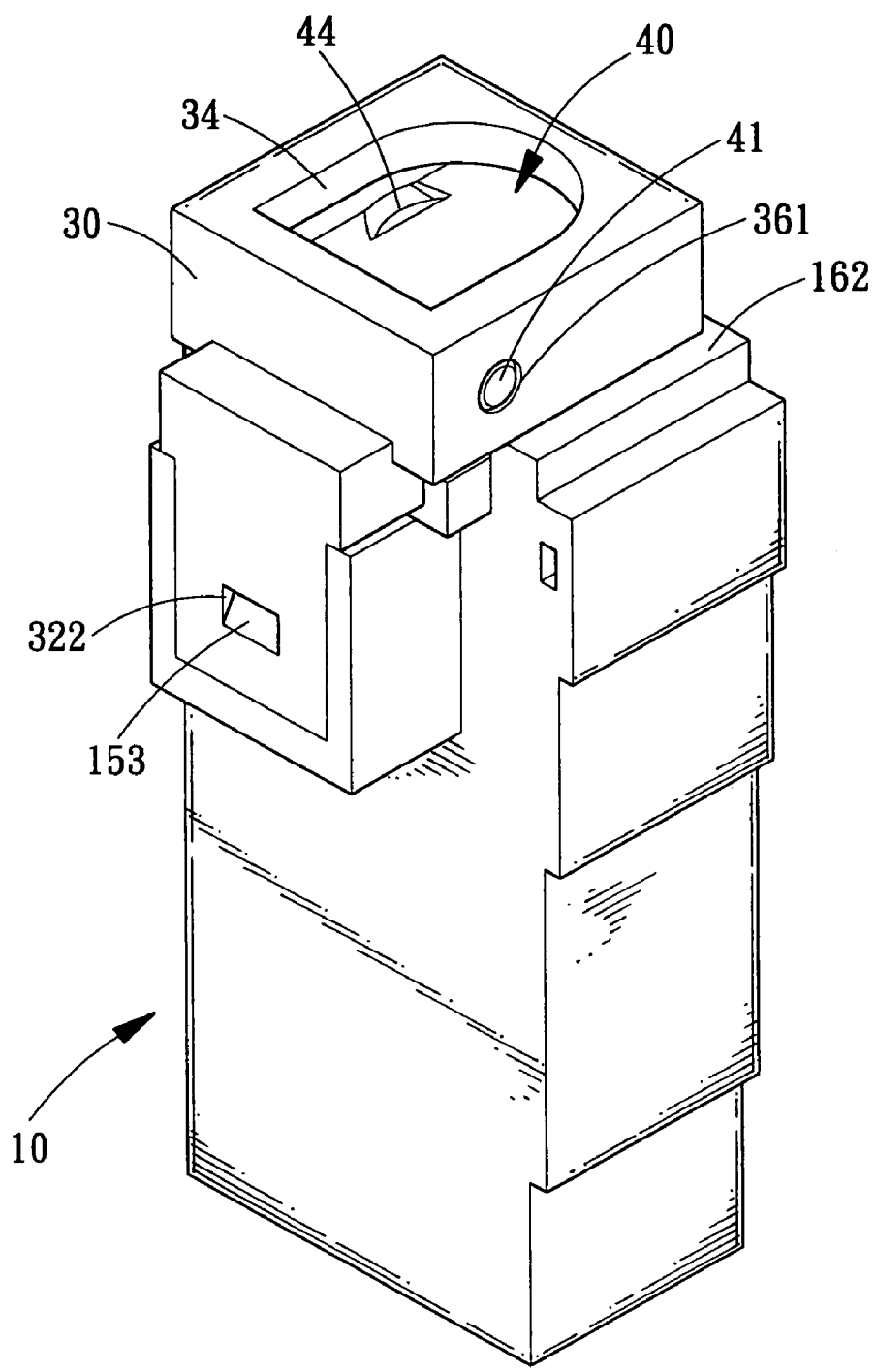
FIG. 1 is an assembly stereographic view of a dual-use coaxial optical fiber connector in accordance with the present invention.
Figure 2:
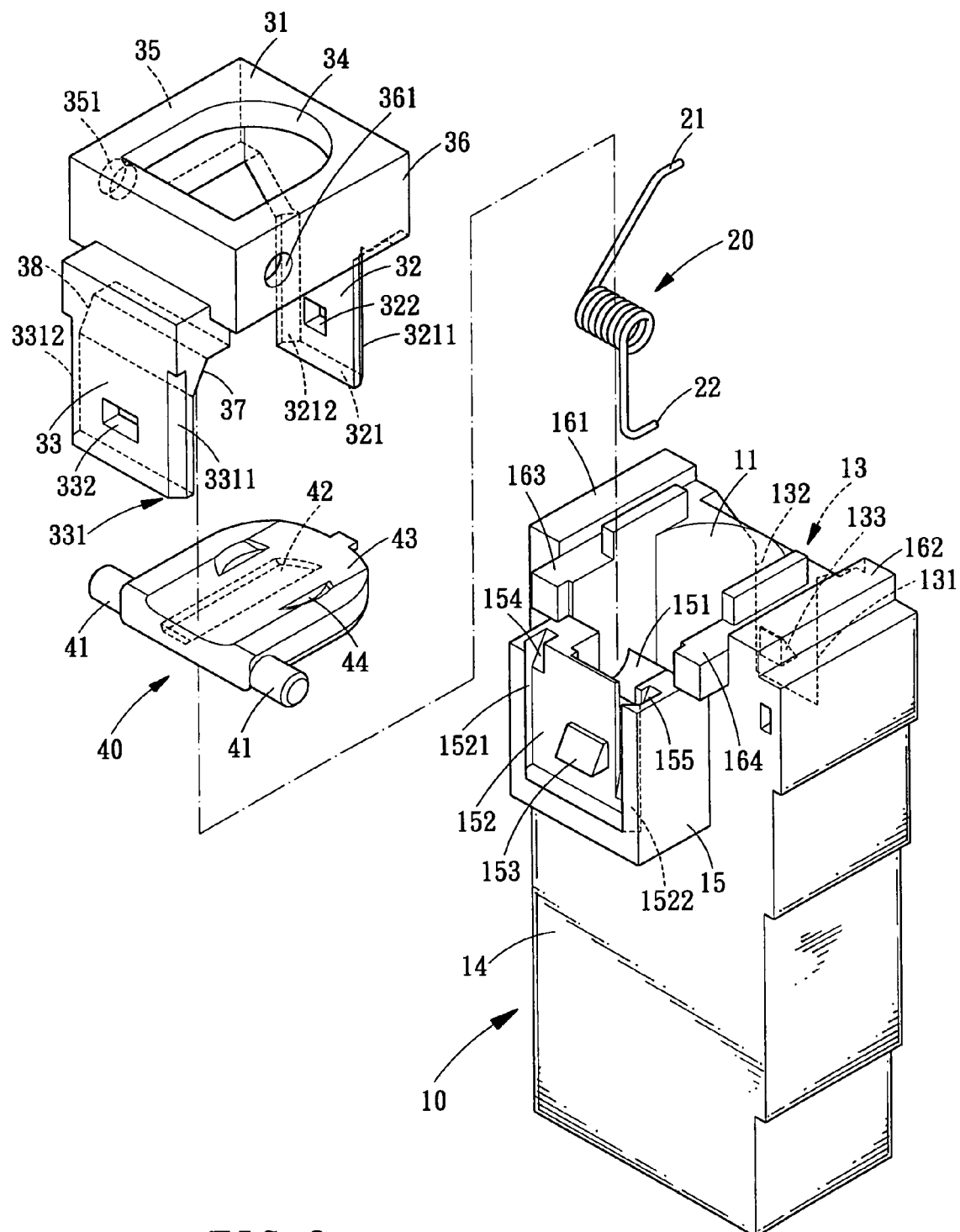
FIG. 2 is an exploded view of a dual-use coaxial optical fiber connector in accordance with the present invention.

Referring to FIGS. 1 and 2, a dual-use coaxial optical fiber connector in accordance with a preferred embodiment of the present invention is shown and generally includes: a main body 10, a spring 20, an assembly seat 30 and a dust-proof cover 40.

Figure 3:
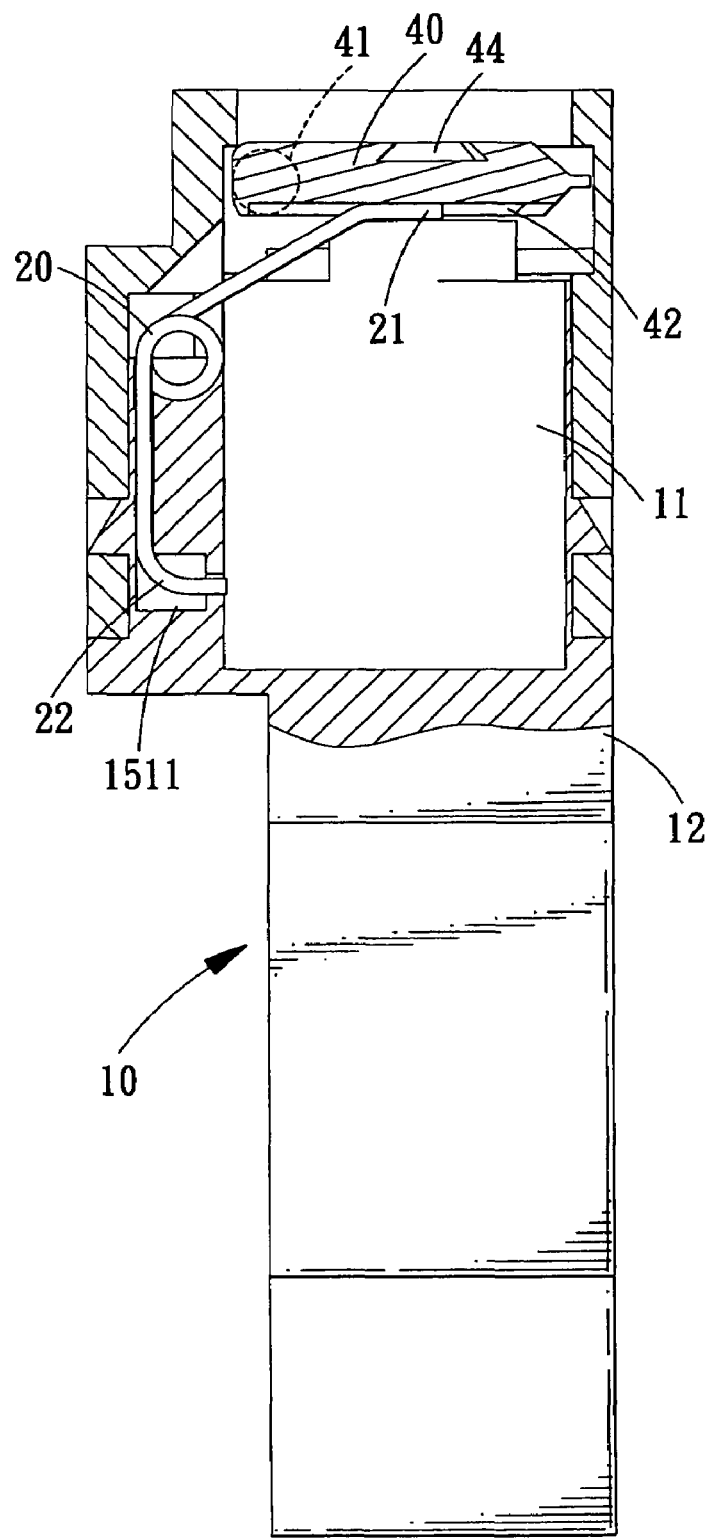
FIG. 3 is a partial cross sectional view of a dual-use coaxial optical fiber connector in accordance with the present invention.

The main body 10 is integrally formed in the shape of a cube, at the center of which is formed a receiving hole 11, and on a sidewall 12 of the main body 10 is formed a assembling groove 13 (as shown FIG. 3) whose both opposite sidewalls are concave bevels 131 and 132. On a bottom surface of the assembling groove 13 is provided a locking element 133. A groove seat 15 is provided on another sidewall 14 of the main body 10 opposite to the sidewall 12 and the groove seat 15 is provided with a spring seat 151 which is formed with a through hole 1511 (as shown in FIG. 3). On the outer surface of the groove seat 15 is formed an assembling groove 152 whose two opposite sidewalls are concave bevels 1521 and 1522. On the bottom of the assembling groove 152 is provided a locking element 153. Two cavities 154 and 155 are formed on top surface of the groove seat 15, and two supporting portions 161 and 162 are disposed at top surface of the main body 10 in such a manner that the supporting portion 161 and the top surface of the main body 10 define a locking groove 163 therebetween, and in the same manner, the supporting portion 162 and the top surface of the main body 10 define a locking groove 164 therebetween.

The spring 20 is a torsion spring disposed in the spring seat 151 in a manner that a first end of 21 the spring 20 protrudes out of the receiving hole 11 of the main body 10 and a second end 22 of which is fixed in the through hole 1511 of the spring seat 151 (as shown in FIG. 3).

The assembly seat 30 is generally Π-shaped, which includes a top portion 31 and two opposite projecting walls 32, 33. On the top portion 31 is formed a assembling hole 34, at a lower end of the projecting wall 32 is formed an assembling bevel 321 which has two opposite inclined sides 3211, 3212. The assembling bevel 321 is formed with a locking hole 322. At a lower end of the projecting wall 33 is formed an assembling bevel 331 which has two opposite inclined sides 3311, 3312. The assembling bevel 331 is formed with a locking hole 332. The assembly seat 30 further has two opposite sidewalls 35 and 36 which are located below the top portion 31, each of which is formed with a pivot hole 351, 361. The bottom surfaces 352, 362 of the sidewalls 35, 36 are parallel to the top portion 31. At the connecting portion between the projecting wall 33 and the top portion 31 are formed two projecting step portions 37 and 38.

The dust-proof cover 40 is formed in the shape of a fan and provided at both sides with a shaft 41, respectively. A limiting groove 42 is formed at the bottom surface of the dust-proof cover 40, and a sliding groove 43 is formed at the top surface of the dust-proof cover 40. In the sliding groove 43 are further formed two parallel cavities 44.

As mentioned above, the assembly seat 30 is generally Π-shaped, and the shafts 41 at both sides of the dust-proof cover 40 are used to insert in the pivot holes 351, 361 of the assembly seat 30, respectively, so that the dust-proof cover 40 can be prevented from being disengaged from the assembly seat 30.

As mentioned above, at the lower end of the projecting wall 32 of the assembly seat 30 is formed the assembling bevel 321 having the two inclined sides 3211, 3212. At the lower end of the projecting wall 33 of the assembly seat 30 is formed the assembling bevel 331 having the two inclined sides 3311, 3312. These structures are specially designed to correspond to the concave bevels 131, 132, 1521, 1522 of the assembling grooves 13, 152 on the main body 10.

Furthermore, the locking holes 322, 332 are respectively designed to engage with the locking elements 133 and 153. Thereby, the assembly seat 30 can be firmly assembled on the main body 10.

On the other hand, the projecting step portions 37, 38 of the assembly seat are used to insert in the cavities 154, 155 of the main body 10, respectively. The sidewalls 35 and 36 of the assembly seat 30 are employed to engage in the locking grooves 163, 163 of the main body 10. This structural design enables the assembly seat 30 to be assembled on the main body 10 very easily, so as to save the assembly time.

The two parallel cavities 44 in the sliding groove 43 on the top surface of the dust-proof cover 40 are designed to guide the insertion of the optical fiber connector.

Figure 4:
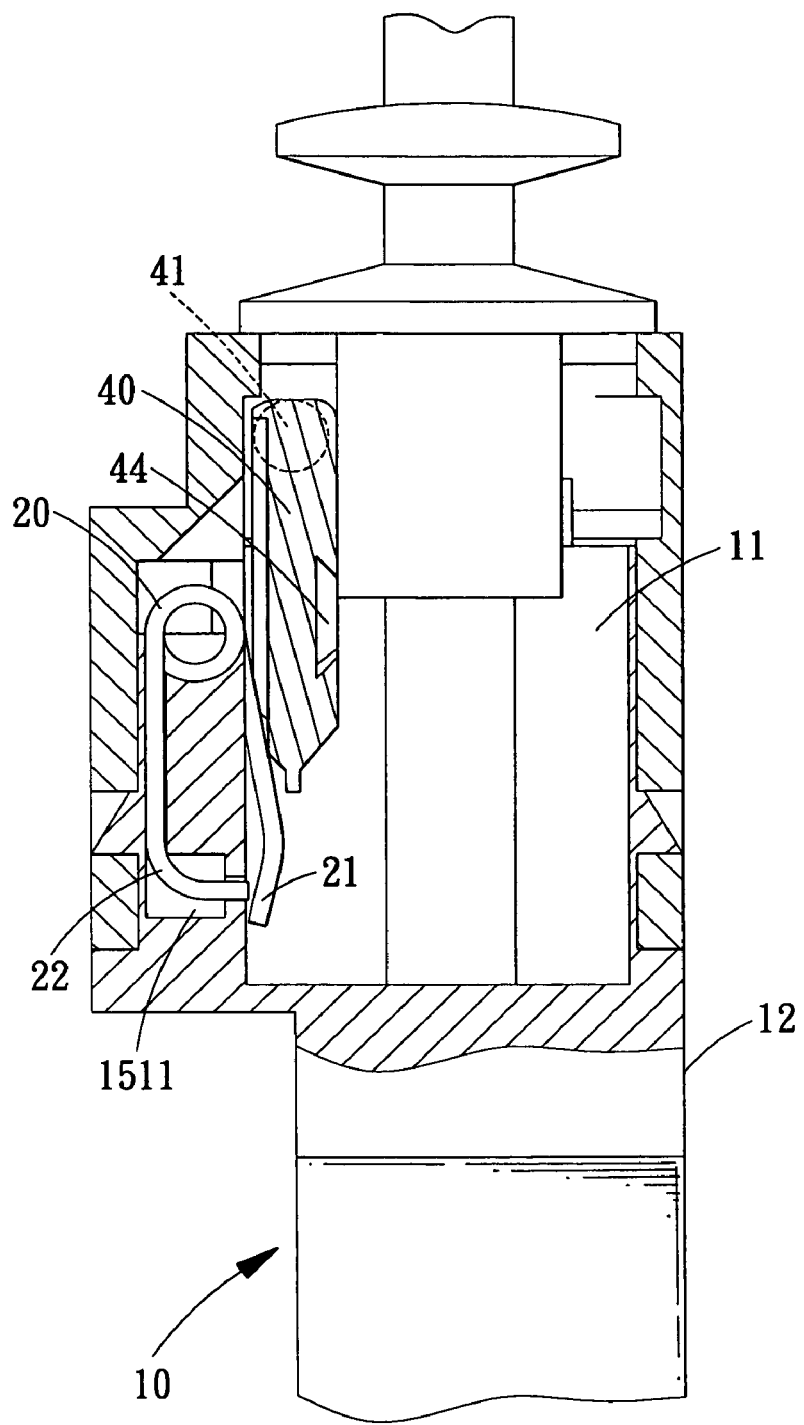
FIG. 4 is a partial cross sectional view of showing the terminal is being inserted into the fiber connector.

For explicit explanation of how the optical fiber of the present invention works, please refer to FIG. 4, when assembling the optical fiber connector, the user can insert the connector in the sliding groove 43 on the top of the dust-proof cover 40 and push it to move along the parallel cavities 44, so that the connector is easily assembled in the main body 10. After the optical fiber connector is pulled out of the main body, the resilience of spring 20 pushes the dust-proof cover to seal the assembling hole 34 of the assembly seat 30, so as to prevent the dust.

While we have shown and described various embodiments in accordance with the present invention, it should be clear to those skilled in the art that further embodiments may be made without departing from the scope of the present invention.

What is claimed is:

1. A dual-use coaxial optical fiber connector comprising:
    a main body formed with a receiving hole and two opposite assembling grooves, in each of the assembling grooves provided a locking element, a sidewall of the main body provided with a spring seat;
    a spring disposed in the spring seat of the main body in a manner that a first end of the spring protrudes out of the receiving hole of the main body and a second end of the spring is fixed in a through hole of the spring seat;
    an assembly seat being Π-shaped and having a top portion and two opposite projecting walls, wherein an assembling hole is formed on the top portion, at a lower end of each of the projecting walls is formed an assembling bevel, the assembling bevel is formed with a locking hole, the assembling bevel of the assembly seat is engaged in the respective assembling grooves of the main body, and the locking element of the main body is engaged in the locking hole of the assembly seat, two opposite sidewalls formed on the assembly seat and located below the top portion, each of the sidewalls is formed with a pivot hole;
    a dust-proof cover formed in the shaped of a fan and provided at both sides with a shaft which is to be engaged in the pivot hole on the sidewalls of the assembly seat, and a first end of the spring presses against a bottom surface of the dust-proof cover;
    a sliding groove is formed at a top surface of the dust-proof cover for guiding the insertion of an optical fiber connector; and
    two parallel cavities are formed in the sliding groove for guiding the optical fiber connector.

2. The dual-use coaxial optical fiber connector as claimed in claim 1, wherein a limiting groove is formed at the bottom surface of the dust-proof cover for positioning the first end of the spring.

3. The dual-use coaxial optical fiber connector as claimed in claim 1, wherein plural step portions are formed at a connecting portion between the projecting wall and the top portion of the assembly seat, so as to correspond to cavities formed on a groove seat of the main body.

\* \* \* \* \*